March 5, 1963    R. L. MARKWOOD    3,079,838
PROJECTOR FOR TESTING VISUAL ACUITY
Filed Jan. 7, 1960    4 Sheets-Sheet 1

INVENTOR.
RONALD L. MARKWOOD
BY
Attorney

March 5, 1963 R. L. MARKWOOD 3,079,838
PROJECTOR FOR TESTING VISUAL ACUITY
Filed Jan. 7, 1960 4 Sheets-Sheet 2
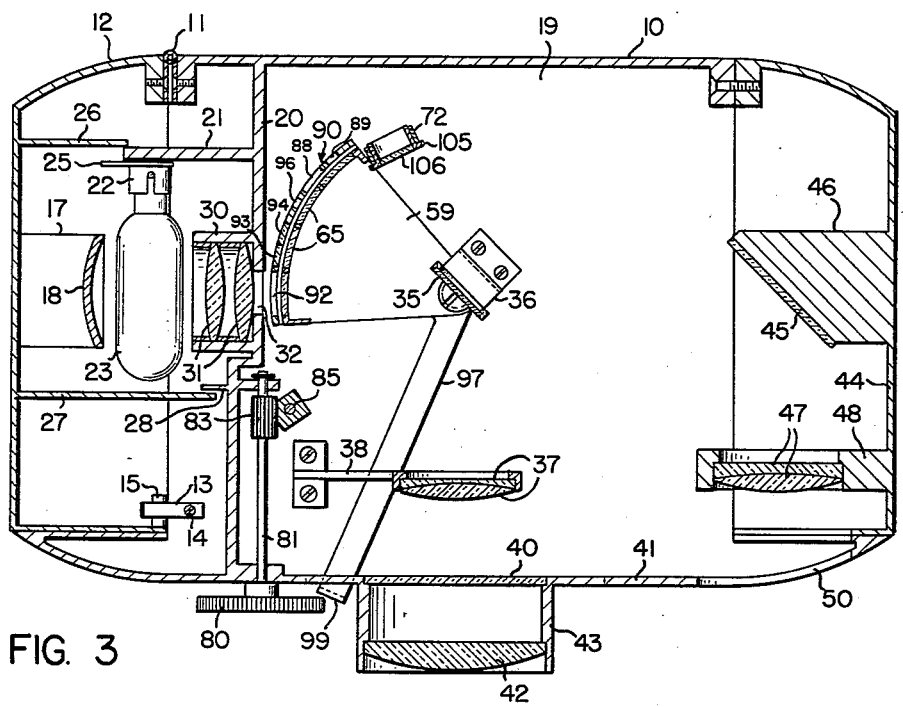
FIG. 3
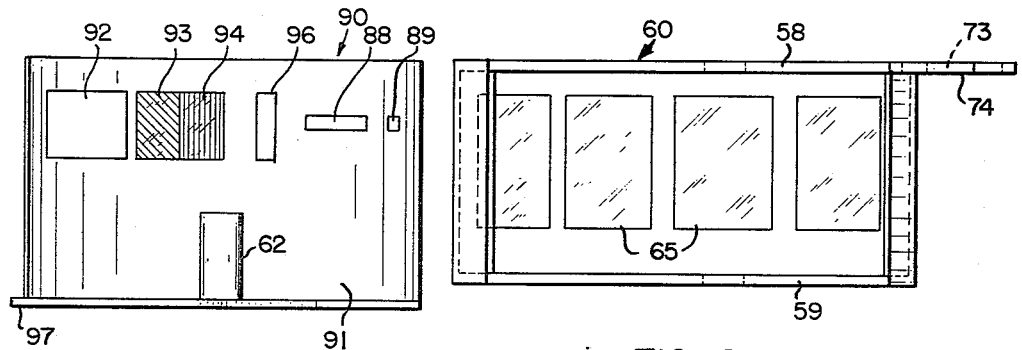
FIG. 8
FIG. 9
INVENTOR.
RONALD L. MARKWOOD
BY
Attorney

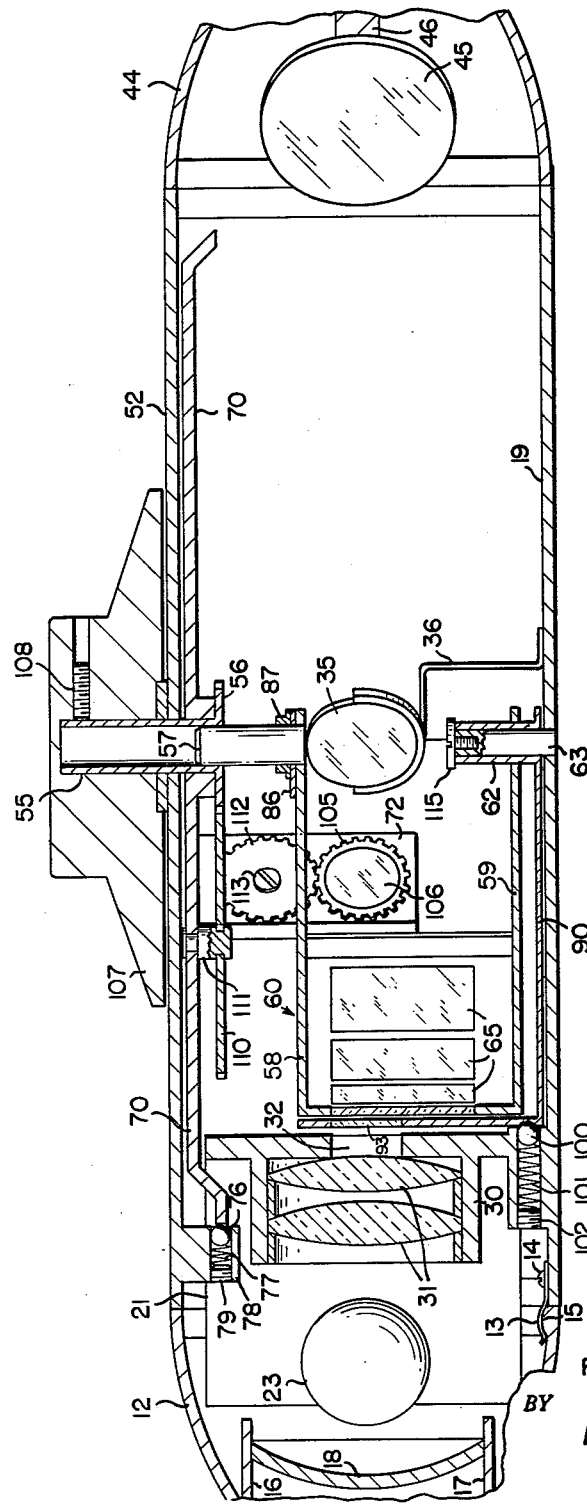

March 5, 1963 R. L. MARKWOOD 3,079,838
PROJECTOR FOR TESTING VISUAL ACUITY
Filed Jan. 7, 1960 4 Sheets-Sheet 4

INVENTOR.
RONALD L. MARKWOOD
BY
Attorney

United States Patent Office 3,079,838
Patented Mar. 5, 1963

3,079,838
PROJECTOR FOR TESTING VISUAL ACUITY
Ronald L. Markwood, Bedford, Pa., assignor to Textron Inc., Providence, R.I., a corporation of Rhode Island
Filed Jan. 7, 1960, Ser. No. 969
12 Claims. (Cl. 88—20)

The present invention relates to acuity projectors, that is, to projection equipment for use in testing the acuity of a person's vision.

In conventional equipment for testing acuity, the projector is mounted on the top of a stand, and it has an axially adjustable focusing tube which contains the focusing lenses of the focusing system. The apparatus looks top-heavy because of the long, forwardly-projecting focusing tube; and it is anything but a handsome piece of equipment. Moreover, with the conventional type of acuity projector, the only image of the charts, which is projected, is that on a screen which is at some distance behind the refractionist as the practitioner stands looking at the patient. As a result, the refractionist has to turn constantly away from the patient to see what the patient is viewing. This constant turning back and forth between the patient and the screen is tiring on the practitioner; and he feels it at the end of a day.

Another disadvantage of the conventional projector is that in order to avoid having a patient memorize charts the practitioner will, from time to time, have to change the charts in the projector. This means that the practitioner will have to have a slide storage box and will have from time to time, to pick new charts from the box, and manually change the slides in the projector.

Furthermore, few practitioners have more than one rotatable astigmatic dial slide, and when it is necessary to change slides a shuffle back and forth of the slides must be effected.

One object of the present invention is to provide a projector which will eliminate the constant turning around of the refractionist between the patient and the chart, which has heretofore been required.

Another object of the invention is to provide a projector so constructed that the practitioner may face the projector controls at all times.

Another object of the invention is to provide a projector having a monitoring screen incorporated therein which will show the practitioner exactly the same image as is being projected on the screen or chart that the patient is viewing, so that the practitioner need not interfere with the projected beam of light.

Another object of the invention is to provide a projector in which multiple slides may be mounted so that the refractionist can readily, and without appreciable loss of time, change the slides to prevent a patient from memorizing a chart.

Another object of the invention is to eliminate the necessity for a slide storage box.

A further object of the invention is to provide in the projector itself a slide change wheel, similar to the conventional refractor wheel, with which all practitioners are acquainted, and which will carry a plurality of charts or slides, and which can readily be operated by the practitioner, and enable him quickly and conveniently to change charts.

Another object of the invention is to provide a projector in which various apertures, diaphragms and accessories, such as horizontal and vertical slits, bi-chrome test slides and Worth-Four-Dot tests, which are required in testing vision, are all controlled by one conveniently located lever.

Another object of the invention is to provide a projector having a rotatable astigmatic dial mounted therein which is always centered on the screen when clicked into operative position.

Another object of the invention is to provide a projector in which the astigmatic dial and the slide change wheel are so mounted that one click on the slide wheel brings back the slide positioned exactly as it was before the astigmatic test, without any further adjustment being necessary.

Another object of the invention is to provide a projector in which the astigmatic dial is enclosed with the other slides, eliminating the conventional, awkward looking slide and dial knob.

Another object of the invention is to provide a projector in which the controls are combined in such way as to allow extremely efficient and effortless operation.

A further object of the invention is to provide a projector in which the light bulb can readily be changed, should it be burned out, immediately and without danger of burning the fingers from the hot bulb or instrument.

A further object of the invention is to provide a projector in which the slides, lens, and all of the adjusting mechanism are sealed in from dust and fingerprints, and from the illumination compartment.

Another object of the invention is to provide a projector of the character described which will be relatively compact.

A still further object of the invention is to provide a projector of the character described which can be placed on a desk, or which will adapt itself to use on any of the present stands on the market.

Still another object of the invention is to provide a projector of improved appearance, one which will lend itself to the thin, rounded, stream-lined, low-silhouette of modern design trend.

Other objects of the invention will be apparent hereinafter from the specification and from the recital of the appended claims, particularly when viewed in conjunction with the accompanying drawings.

In the drawings:

FIG. 3 is a section taken on the line 3—3 of FIG. 2 looking in the direction of the arrows;

FIG. 4 is a fragmentary section taken on the line 4—4 of FIG. 1, looking in the direction of the arrows;

FIG. 8 is a rear elevation of the aperture carriage; and

FIG. 9 is a rear elevation of the slide carriage.

Figure 1:
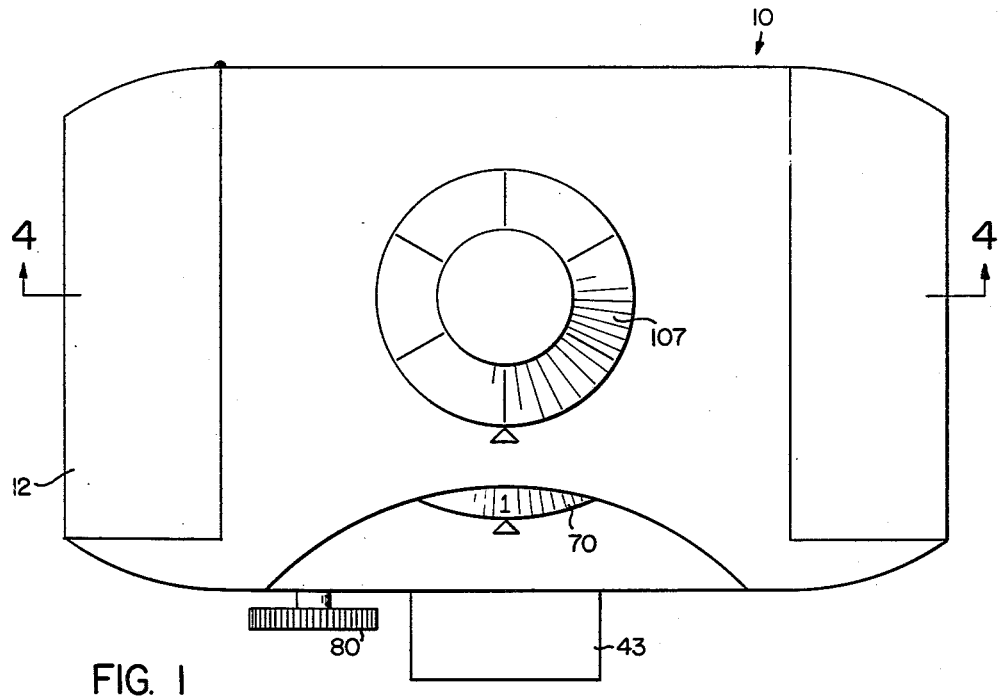
FIG. 1 is a plan view of a projector built according to one embodiment of this invention.

In the embodiment of the invention shown in the drawings, the lamp housing and the reflector are mounted in an end cover hingedly secured to the main projector housing. The condensing lenses of the projector system are positioned on one side wall of a partition in the main projector housing in line with a square aperture or window in the partition, and also in line with the lamp. The light from the lamp, passing through the condensing lenses and the aperture or window, falls on a semi-transparent mirror. Part of the light is reflected from this mirror onto a ground glass screen which is mounted in the front of the housing to be viewed by the refractionist. The rest of the light passes through the mirror and is reflected by a scond mirror to the focusing lenses of the projection system through which it is projected at a distant screen, outside the projector housing, which is mounted, usually at the opposite side of the room from the projector, for viewing by the patient.

Mounted between the aperture or window and the semi-transparent mirror are a rotatably and axially adjustable slide carriage, and a rotatably adjustable aperture carriage. The slide carriage is adapted to carry a plurality of slides or charts, such as a Snellen letter chart, etc., which bear test characters and figures required in the acuity test. Mounted on this carriage, also, at one side laterally of the carriage are a rotary astigmatic lens or chart and the means for rotating the same. The aperture carriage has a square opening in it of the same size as the aperture in the partition, a rectangular slit about one-third this size, a horizontal slit, a small hole, and a red and green screen such as are commonly provided for acuity tests.

The slides or charts on the slide carriage are double slides in the sense that they are twice the height of the aperture in the partition. By indexing the aperture carriage to different positions, then, and by indexing the slide carriage to different positions and by adjusting the slide carriage up or down, any portion of any slide or chart can be projected and in two colors. This projection is, of course, simultaneously onto the ground glass or monitoring screen in the front of the projection housing, and onto the outside screen viewed by the patient.

When the slide carriage is indexed far enough to bring the astigmatic chart into registry with the aperture or window in the partition this chart will be projected on the two screens. When in projecting position it can readily be rotated to effect the test for astigmatism.

The various controls for rotatably adjusting the two carriages and the astigmatic chart, and for moving the slide carriage up and down, are in the form of knobs, a lever, and wheels, all of which are disposed to be readily manipulated at the outside of the projector housing.

Referring now to the drawings by numerals of reference, 10 denotes the casing or housing of a projector built according to one embodiment of this invention. Pivotally mounted at one end of this housing, and connected thereto by a hinge 11 (FIG. 3) is a door 12. The door is adapted to be held in closed position by a spring clip 13, which is secured to the bottom wall 19 of the housing by a screw 14. The clip 13 is adapted to engage a rounded boss 15 (FIGS. 3 and 4) that is formed integral with the door on the inside bottom wall thereof in a position to snap under the clip 13 when the door is closed.

A partition 20 extends transversely of the housing from front to rear. Projecting laterally from this partition at one side thereof is a wall 21 on which is mounted a socket 22 for the projection lamp 23. The socket 22 may be of the ejection type, such as is commonly employed in holders for flash bulbs on cameras, so that, when the door 12 is opened, by manipulating a non-metallic lever 25, the bulb 23 will be ejected from the socket, without having to handle it, to permit its replacement.

Mounted between ledges 16 and 17, that are integral with the door 12 and that project inwardly therefrom, is a reflector 18. When the door is closed the reflector is aligned with the lamp 23. The door also has parallel walls 26 and 27 projecting inwardly therefrom which cooperate with the wall 21 and a parallel wall 28, that is formed on the partition 20, to constitute a housing for the lamp 23, when the door is closed.

Integral with the partition 20 and disposed between the walls 21 and 28 and between the lamp 23 and the partition 20 is a holder 30. Mounted in conventional fashion within this holder 30, are the condensing lenses 31 of the projecting system. There is a square aperture or window 32 in the partition 20 which is aligned with the lenses 31 and through which the light passes from the lamp 23.

The light passes from the aperture 32 to a partially transparent mirror 35 which is mounted in any suitable manner on a bracket 36 that is secured to the bottom wall 19 of the housing. The bracket 36 is positioned so that the reflecting surface of the mirror is inclined at an angle of 45° to the axis of the beam of light coming through the aperture 32. The reflector transmits the beam of light to the focusing lenses 37, which are carried by a bracket 38 that is also secured to the bottom wall 19 of the casing. These focusing lenses, which may be of any suitable construction, serve to focus the light onto a ground glass or screen 40 which is secured in the front wall 41 of the housing. This ground glass or screen 40 provides a monitoring screen which can be watched by the refractionist while he is manipulating the slides, lenses, etc. of the projector, and without turning his head to view the screen that is viewed by the patient. Mounted in a tubular projection 43 of the housing and in front of the screen 40 is a magnifying lens 42 which makes the image on the ground glass or screen 40 readily visible to the refractionist.

The mirror 35 is, as stated, a partial surface mirror, such as is commonly employed in rangefinder systems of cameras. Therefore, while part of the light beam from aperture 32 is reflected by this mirror to the focusing lenses 37, another part of it passes through the mirror 35 to another mirror or reflector 45. This mirror is mounted on a bracket 46, which may be secured, for instance, to the right-hand end wall of the housing. The mirror or reflector 45 also has its reflecting surface inclined at an angle of 45° to the axis of the beam of light coming from the aperture 32.

Mounted in front of the reflector 45 are the main focusing lenses 47 of the projection ssytem. They may be of suitable construction and are carried, for instance, by a bracket 48 from the righthand end wall of the projector housing. There is an opening 50 (FIGS. 2 and 3) in the front wall of the housing in registry with these lenses 47; and it is through this opening that the rays of light pass from the lenses 47 to the viewing screen which is outside the projector and which may be across the room from the projector.

Journaled in the upper wall 52 of the housing is a tubular stem 55 (FIG. 4), which has a spur gear 56 formed integral with it at its lower end. The purpose of this gear will be described later. Journaled in the tubular stem 55 is a trunnion pin 57 to the lower end of which there is riveted, or otherwise fixed, the upper plate 58 of an arcuate, sector-shaped slide carriage 60 whose parallel lower arm or plate 59 is journaled on a sleeve 62 that is rotatably mounted on a guide post 63 which is secured to the lower wall 19 of the housing.

Figure 5:
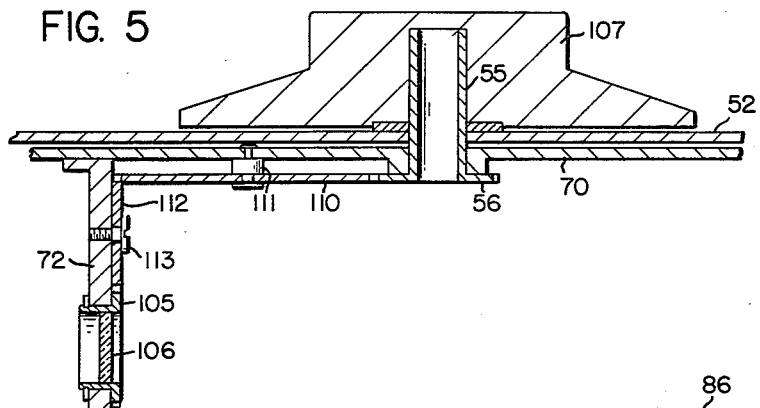
FIG. 5 is a fragmentary vertical sectional view showing how the astigmatic lens or chart is mounted.
Figure 6:
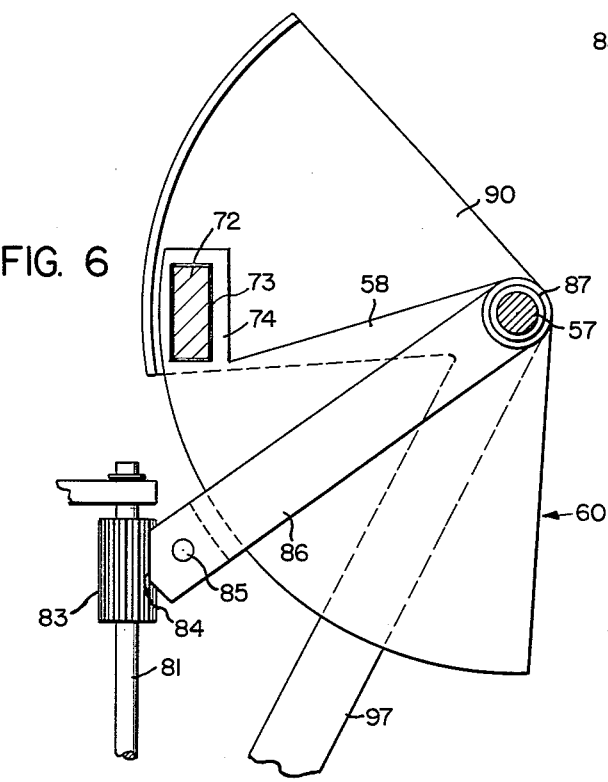
FIG. 6 is a fragmentary horizontal sectional view on a larger scale than FIG. 3 showing the slide carriage in a different angular position from that of FIG. 3.

Mounted around the periphery of the arcuate slide carriage 60 are a plurality of slides 65 (FIGS. 4 and 9) for making different tests of the patient's vision. The slide carriage 60 is adapted to be indexed, to bring these different slides selectively into registry with the aperture 32 so that the light may pass through them, and their images may be transmitted both to the monitoring screen 40 and to the main viewing screen. For indexing the slide carriage, there is mounted rotatably on the tubular stem 55 a slide selector wheel 70 (FIGS. 1 and 4). This wheel is graduated on its periphery, being numbered according to the numbering of the slides on the slide carriage. The wheel projects out through a slot 71 (FIG. 2) in the front wall of the housing 10 and reads against an index mark (FIG. 1) on the adjacent portion of the housing. Secured to this wheel to project downwardly therefrom is a bracket 72 (FIGS. 5 and 6) which passes through a slot 73 in a lateral projection 74 of the upper arm 58 of the slide carriage 60. When the wheel 70 is rotated, this bracket 72 serves to impart rotation to the slide carriage 60.

The slide carriage 60 is adapted to be held in any angularly indexed position by a ball detent 76 (FIG. 4) which is adapted to engage in notches in the periphery of the wheel 70. This detent is constantly urged toward engaging position by a coil spring 77 that is mounted in a lug 78 which is formed integral with the upper wall of the housing. A screw 79 which threads into the lug serves to adjust the tension of the spring 77.

Figure 7:
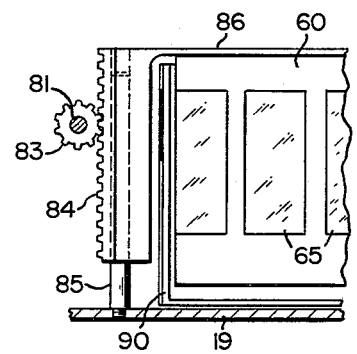
FIG. 7 is a fragmentary elevation view of the slide and aperture carriages, and showing, also, the means for adjusting the slide carriage axially, that is, vertically.

Any portion of any of the slides 65 (FIGS. 4 and 9) can be brought into operative position in registry with aperture 32 by raising or lowering the slide carriage 60. The vertical movement for raising or lowering the slide carriage is achieved by rotation of the knob 80 (FIG. 3). This knob is secured to the outer end of a shaft 81 which is journaled in the housing, and which carries adjacent its inner end a spur pinion 83 that meshes with a rack 84 (FIG. 7). This rack is integral with an arm 86 (FIGS. 6, 7 and 4) whose inner end engages over the trunnion 57 between the upper arm 58 of the slide carriage 60 and a retainer sleeve or washer 87 which is pinned or otherwise secured to the post 57 against movement relative thereto. Hence, as the knob 80 is rotated in one or the other direction to effect upward or downward movement of the rack 84, slide carriage 60 will be moved correspondingly up or down to bring either the upper or lower portion of a slide 65 into registry with the aperture 32, depending upon the direction of movement of the knob. The rack 84 is guided in its reciprocating movement by a pin 85 that threads into bottom wall 19 of the housing.

The slide carriage 60 shown holds four slides 65 which can be successively indexed into registry with the aperture 32 for projection. When aligned with the aperture 32 they are firmly and accurately centered in the projection system by the ball detent 76. The vertical adjustment of the carriage 60 and the rotary adjustment thereof make it possible to present any particular slide 65 in the proper position and alignment for projection of that slide. The vertical adjustment permits any portion of the entire slide, from top to bottom, to be projected.

Mounted coaxially with the slide carriage 60 and also of arcuate sector shape, is an aperture carriage 90 (FIGS. 8, 3 and 4) that is formed integral with the guide sleeve 62 (FIG. 4) at the lower end thereof. This carriage 90 has an arcuate peripheral wall 91 which is adapted to have a full aperture or slot in it, as denoted at 92 (FIG. 8), a green glass 93, a red glass 94, a vertical slit 96, a horizontal slit 88, and a small square opening 89. The carriage 90 is adapted to be rotatably indexed about its axis by lever arm 97 (FIG. 3), which is integral with the carriage and which projects outwardly through the slot 98 (FIG. 2) in the front wall 41 of the casing. This lever arm may be manipulated by the handle 99. The carriage 90 is adapted to be held in any indexed position by a ball detent 100 (FIG. 4) that is adapted to engage in notches in the peripheral wall 91 of the carriage. This detent is constantly urged into operative position by a spring 101. The tension of this spring may be adjusted by a screw 102 that threads into a boss formed on the inside bottom wall of the housing.

The upward movement of the slide carriage 60 is limited by the head of the screw 115 (FIG. 4) which threads into the post 63. The diameter of the head of this screw is great enough that the screw will engage the lower arm 59 of the slide carriage to limit the upward movement of the slide carriage. Downward movement of the slide carriage is limited by the aperture carriage 90.

The provision of the bracket or guide 72 permits of the vertical adjustment of the slide carriage without interference with its rotary adjustment. When the operator turns the wheel 70 the guide 72 will rotate the slide carriage.

As the control lever 97 is moved from left to right, the aperture carriage 90 presents the differently sized and shaped apertures 92, 96, 88 and 89 and the differently colored filters 93, 94 in alignment with the optical system, thus enabling the operator to vary the portion, amount and color of slide 65 projected. Hole 89 is of a size to permit selection of a single character of a chart 65 for projection, and apertures 96 and 88 permit selection of a vertical or a horizontal line or portion of a chart for projection. Aperture 92 is of the same size as aperture 32 and filters 93, 94 together are of the same size as aperture 32. Hence aperture 92 and filters 93, 94, when aligned with a slide or chart 65 permit projection of any selected half of the slide or chart.

Rotatably mounted in the bracket 72 is a spur sleeve gear 105 (FIGS. 4 and 5) in which is secured an astigmatic dial or chart 106. When the wheel 70 is indexed far enough to bring this dial into registry with the aperture 32, it can be rotated for test of astigmatism by means of the knob 107 (FIGS. 1, 2, 4 and 5) which is secured by the set-screw 108 to the tubular stem 55. When the knob 107 is rotated, the spur gear 56, which is integral with the stem 55, rotates the spur gear 110 which is journaled on a stud 111 that is riveted in the wheel 70. This spur gear meshes with another spur gear 112, which is mounted by means of the stud 113 on the bracket 72 with its axis at right angles to the axis of rotation of the gear 110. The gear 112 meshes with the sleeve gear 105.

Figure 2:
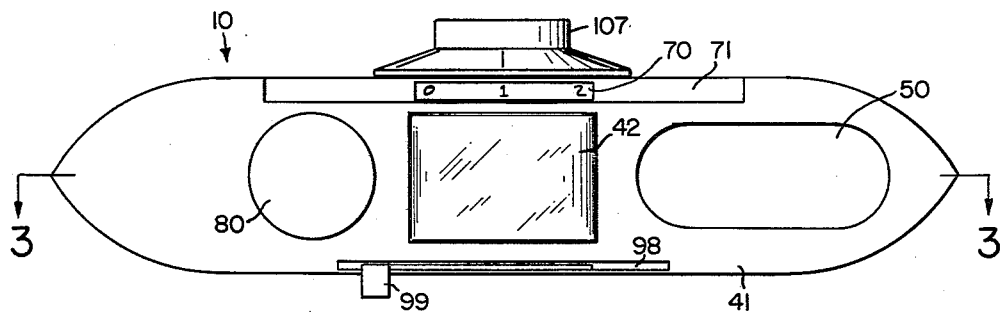
FIG. 2 is a front elevation of this projector.

The astigmatic dial is located at the proper height vertically in the bracket 72 so that it is aligned with aperture 32 and with the optical system when it is in proper angular position for use. The gear 56, the gear 112, and the gear 105 are all of the same diameter and have the same number of teeth. This allows the astigmatic dial to rotate exactly the same number of degrees as the astigmatic dial control knob 107, and allows knob 107 to be calibrated in degrees, as shown in FIGS. 1 and 2, for exact angular location of the astigmatic dial. The graduations of knob 107 read against an index mark on the outside of the top wall of the housing.

In the device of the present invention, the angular systems of projection makes it possible for containment of the entire lens system within the projector housing without a lens tube. This helps the appearance of the projector and, moreover, makes it possible for the controls to face the refractionist or operator as he faces the patient without interfering with the projected beam of light. Focusing lenses 37 and 48 may, of course, be mounted for axial adjustment to the brackets 38 and 48, if desired, for focusing.

The monitor screen 40 is a miniature screen on the front of the projector facing the operator upon which is optically and mechanically duplicated a replica of the projected material. The use of this monitor screen enables the refractionist to look at the patient at all times, and reduces the fatigue of refractionation.

As will be seen, the projector of this invention is extremely compact, and enables a refractionist to change slides quickly without having to remove any slide from the projector. Moreover, he can readily project any portion of any slide.

The hinged movement of the door 12 permits of free access to the exposed lamp, and the non-metallic lever 25 can then be manipulated to actuate the bulb ejection sleeve allowing the bulb to be ejected without actually having to handle the hot bulb by hand. This permits quick change of a burned-out bulb and minimizes the shut-down time of the projector.

Instead of using a partially-transparent or partially-silvered mirror 35, it is obvious that a duplicate series of slides may be fitted into an extension of the slide carriage 60, and arranged so that when a desired slide 65 in the slide carriage 60 is aligned for projection, a duplicate of this slide will appear magnified and illuminated in the monitor aperture. The movement of the duplicate slides vertically and horizontally will be exactly the same as the projected slides since they are all contained in the same carriage. By a system of mirrors and magnification, the material projected on the patient's viewing screen can also be imaged on the monitor screen.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A projector for ophthalmic testing comprising a housing, a lamp mounted in said housing, a screen mounted in the front wall of said housing to be visible from its front outside of said housing, projecting lenses mounted in said housing in optical alignment with said lamp, said housing having an aperture in said front wall spaced from said screen and in optical registry with said projecting lenses, a slide carriage holding a plurality of test slides for testing a person's vision, means for indexing said carriage to move said slides selectively into projecting position in optical alignment with said projecting lenses and between said lamp and said aperture to effect projection of a slide through said aperture onto a screen outside of said housing and spaced therefrom, and means for simultaneously effecting projection of said slide onto the rear of first-named screen.

2. A projector for ophthalmic testing comprising a housing having a lamp chamber and a projection chamber, an opaque partition disposed in said housing between said chambers and having an aperture therethrough, a lamp and condensing lenses mounted in said lamp chamber in optical alignment with said aperture, a beam splitter in said projection chamber in optical alignment with said aperture, a screen mounted in the front wall of said projection chamber to be visible from the front outside of said housing, a first projecting lens disposed in said projection chamber between said beam splitter and said screen to project part of the beam of light from said beam splitter onto the rear of said screen, said housing having an aperture in said front wall spaced from said screen, a second projecting member disposed in said projection chamber between said beam splitter and the last-named aperture in optical alignment with both to project the rest of the beam of light exteriorly of said housing, a slide carriage holding test slides for testing a person's vision, and means for moving said slide carriage to dispose a slide carried thereby between the first-named aperture and said beam splitter thereby simultaneously to project said slide onto said screen and through said last-named aperture onto another screen outside of said housing and spaced therefrom.

3. A projector for ophthalmic testing, comprising a housing having an opaque partition dividing it into two chambers, said partition having an aperture therethrough, a lamp in one of said chambers in optical alignment with said aperture, a screen mounted in the front wall of the other chamber to be visible from the front outside of said housing, a beam splitter in said other chamber between said aperture and said screen and in optical registry with said aperture and said screen, a projecting lens mounted in said other chamber in optical alignment with said aperture to project part of the beam of light from said lamp onto the rear of said screen, said other chamber having a second aperture in said front wall thereof spaced from said screen, a second projecting lens disposed in said other chamber between said beam splitter and said second aperture in optical alignment with both to project the rest of the beam of light exteriorly of said housing, a slide carriage carrying a plurality of test slides for testing a person's vision, said slide carriage being mounted in said other chamber between the first-named aperture and said beam splitter for rotary movement to index different portions thereof selectively into alignment with the first-named aperture between said first-named aperture and said projecting lenses, an aperture carriage mounted in said other chamber for rotary movement coaxially with said slide carriage, said aperture carriage having a plurality of openings therein of different area, respectively, spaced angularly from one another about its axis, and means for rotatably indexing said aperture carriage about its axis to move said openings selectively into registry with said first-named aperture and between said first-named aperture and said projecting lenses.

4. A projector for ophthalmic testing, comprising a housing having an opaque partition dividing it into two chambers, said partition having an aperture therethrough, a lamp in one of said chambers in optical alignment with said aperture, a projecting lens mounted in the other chamber in optical alignment with said aperture, a slide carriage adapted to carry a plurality of slides, said slide carriage being mounted in said other chamber for rotary movement to index different portions thereof selectively into alignment with said aperture between said aperture and said projecting lens, an aperture carriage mounted in said other chamber for rotary movement coaxially with said slide carriage, said aperture carriage having a plurality of openings therein of different area, respectively, spaced angularly from one another about its axis, and means for rotatably indexing said aperture carriage about its axis to move said openings selectively into registry with said aperture and between said aperture and said projecting lens, and means for moving said slide carriage axially of its rotary axis to bring different portions of a slide into registry with said aperture.

5. A projector for ophthalmic testing, comprising a housing having an opaque partition dividing it into two chambers, said partition having an aperture therethrough, a lamp in one of said chambers in optical alignment with said aperture, a projecting lens mounted in the other chamber in optical alignment with said aperture, a slide carriage rotatably mounted in said other chamber, and means for rotatably adjusting said slide carriage about its axis comprising a graduated wheel rotatably mounted on said housing to be accessible for manipulation from the exterior of said housing, a member secured to said wheel and connecting said wheel to said slide carriage to impart rotation to said carriage upon rotation of said wheel, an astigmatic dial rotatably mounted in said member and positioned to be aligned with said aperture by rotation of said wheel, and means for rotating said dial when it is aligned with said aperture.

6. A projector for ophthalmic testing as claimed in claim 5, in which said astigmatic dial is mounted for rotation on an axis extending at right angles to the axis of said carraige, and in which the means for rotating said dial comprises a graduated dial mounted for rotation coaxially with said wheel to be accessible also for manipulation from the exterior of said housing.

7. A projector for ophthalmic testing, comprising a housing having an opaque partition dividing it into two chambers, said partition having an aperture therethrough, a lamp in one of said chambers in optical alignment with said aperture, a projecting lens mounted in the other chamber in optical alignment with said aperture, a slide carriage mounted in said other chamber for rotatable and axial adjustment, an aperture carriage mounted in said other chamber for rotatable adjustment about an axis coinciding with the axis of adjustment of said slide carriage, said aperture carriage having a plurality of different sized openings and a color filter spaced angularly from one another about the axis of rotation of said aperture carriage, manually-operable means for rotating said slide carriage, manually-operable means for rotating said aperture carriage to align said different openings and colored filter selectively with said aperture, and manually-operable means for moving said slide carriage axially in either direction to vary the portion of a slide which is in alignment with said aperture.

8. A projector for ophthalmic testing as claimed in claim 7, wherein the manually-operable means for rotating said slide carriage comprises a graduated wheel rotatably mounted on said housing, a member secured to said wheel and connecting said wheel to said slide carriage to impart rotation to said carriage upon rotation of said wheel, an astigmatic dial rotatably mounted in said member and positioned to be aligned with said aperture by rotation of said wheel, and means for rotating said dial when it is aligned with said aperture.

9. A projector for ophthalmic testing as claimed in claim 8, in which said astigmatic dial is mounted in said member for rotation on an axis extending at right angles to the axis of said carriage, and in which the means for rotating said dial comprises a manually-operable graduated dial mounted for rotation coaxially with said wheel.

10. A projector for ophthalmic testing, comprising a housing having an opaque partition dividing it into two chambers, said partition having an aperture therethrough, a lamp in one of said chambers in optical alignment with said aperture, a screen mounted in said other chamber in the front wall of said housing, said housing also having an opening in its front wall communicating with said other chamber and spaced from said screen, a slide carriage rotatably mounted in said other chamber, an aperture carriage rotatably mounted in said other chamber for adjustment about an axis coinciding with the axis of said slide carriage, said aperture carriage having a plurality of different sized openings and a colored filter spaced angularly from one another about the common axis of rotation of said carriages, means for manually adjusting said slide carriage about its axis to align different portions thereof selectively with said aperture, means for manually adjusting said aperture carriage about its axis to interpose one of its openings or filter between said aperture and a selected portion of said slide carriage, and means in said other chamber for simultaneously projecting light rays, which pass through said aperture and said selected slide, onto said screen and through the said opening in the front wall of said housing.

11. A projector for ophthalmic testing as claimed in claim 10, wherein the means for rotatably adjustably said slide carriage comprises a wheel mounted on said housing for manual rotation, a member secured to said wheel and connected to said slide carriage to impart rotation to said slide carriage upon rotation of said wheel, an astigmatic dial rotatably mounted in said member for rotation about an axis perpendicular to the common axis of said carriages and positioned to be aligned with said aperture by rotation of said wheel.

12. A projector for ophthalmic testing as claimed in claim 11, wherein means is provided for adjusting said slide carriage axially, and said member extends through a slot in said slide carriage to permit such axial adjustment without interfering with the rotary adjustment of said slide carriage by said member.

References Cited in the file of this patent

UNITED STATES PATENTS

| | | |
|---|---|---|
| 1,166,384 | Partridge et al. | Dec. 28, 1915 |
| 2,213,711 | Lueck | Sept. 3, 1940 |
| 2,366,554 | Peck et al. | Jan. 2, 1945 |
| 2,887,006 | Yale | May 19, 1959 |

FOREIGN PATENTS

| | | |
|---|---|---|
| 26,431 | Great Britain | Nov. 25, 1911 |
| 700,573 | Great Britain | Dec. 2, 1953 |